United States Patent [19]

Kung et al.

[11] Patent Number: 4,493,048
[45] Date of Patent: Jan. 8, 1985

[54] SYSTOLIC ARRAY APPARATUSES FOR MATRIX COMPUTATIONS

[75] Inventors: Hsiang-Tsung Kung; Charles E. Leiserson, both of Pittsburgh, Pa.

[73] Assignee: Carnegie-Mellon University, Pittsburgh, Pa.

[21] Appl. No.: 494,659

[22] Filed: May 16, 1983

Related U.S. Application Data

[63] Continuation of Ser. No. 352,701, Feb. 26, 1982, abandoned, which is a continuation of Ser. No. 968,451, Dec. 11, 1978, abandoned.

[51] Int. Cl.³ ............................................... G06F 7/38
[52] U.S. Cl. ................................... 364/754; 364/724; 364/728
[58] Field of Search ............... 364/754, 755, 756, 757, 364/728, 715, 200, 724

[56] References Cited

U.S. PATENT DOCUMENTS

| | | | |
|---|---|---|---|
| 3,296,426 | 1/1967 | Ball | 364/200 |
| 3,312,943 | 4/1967 | McKindles et al. | 364/200 |
| 3,313,926 | 4/1967 | Minnick | 364/716 |
| 3,364,472 | 1/1968 | Sloper | 364/200 |
| 3,748,451 | 7/1973 | Ingerson | 364/728 |
| 4,040,018 | 8/1977 | Chang et al. | 340/174 TF |
| 4,044,243 | 8/1977 | Cooper et al. | 364/715 |
| 4,052,888 | 10/1977 | Brown et al. | 73/67.8 S |
| 4,059,795 | 11/1977 | Mordwinkin | 324/233 |
| 4,065,808 | 12/1977 | Schomberg et al. | 364/200 |
| 4,078,260 | 3/1978 | Chen et al. | 364/900 |
| 4,090,249 | 5/1978 | Chen et al. | 364/900 |
| 4,150,434 | 4/1979 | Shibayama | 364/728 |
| 4,174,514 | 11/1979 | Sternberg | 364/200 |

OTHER PUBLICATIONS

Laws, Jr. et al., "A Cellular Array Multiplier for GF($2^m$)", IEEE Trans. on Computer, Dec. 1971, pp. 1573-1578.
Chandra, "Matrix Multiplication on a Parallel Processing Machine", IBM Tech. Disclosure Bulletin, vol. 19, No. 12, May 1977, pp. 4830-4833.
Swartzlander, Jr. et al., "Inner Product Computers", IEEE Trans. on Computers, vol. C-27, No. 1, Jan. 1978, pp. 21-31.

Primary Examiner—David H. Malzahn
Attorney, Agent, or Firm—Buell, Blenko, Ziesenheim & Beck

[57] ABSTRACT

A systolic array system of inner product step processors is provided in the form of a mesh connected network which rhythmically compute and pass data through the system. Each processor in the system regularly feeds data in and out, each time performing some computation, so that a regular flow of data is kept up in the network. Many basic matrix computations can be readily and efficiently pipelined on systolic array network systems according to these inventions. Such arrays enjoy simple and regular communication paths and the individual processors in the networks are substantially all identical. Similar hexagonally connected processors can, for example, optionally perform matrix multiplication and LU-decomposition of a matrix. Linearly connected systolic arrays are useful for performing a variety of other computations.

14 Claims, 24 Drawing Figures

Fig.6

| STEP NUMBER | CONFIGURATION | COMMENTS |
|---|---|---|
| 0 | (four processors, $y_1$ in fourth) | $y_1$ is fed into the fourth Processor initialized at O. |
| 1 | ($x_1$ in first, $y_1$ in third) | $x_1$ is fed into the first processor while $y_1$ is moved left one place (From now on the $x_1$ and $y_1$ keep moving right and left, respectively.) |
| 2 | ($x_1, a_{11}, y_1$ in second; $y_2$ in fourth) | $a_{11}$ enter the second processor where $y_1$ is updated by $y_1 \leftarrow y_1 + a_{11} x_1$. Thus $y_1 = a_{11} x_1$. |
| 3 | ($y_1, a_{12}, x_2$ in first; $y_2, a_{21}, x_1$ in third) | $a_{12}$ and $a_{21}$ enter the first and third processors, respectively. $y_2 = a_{11} x_1 + a_{12} x_2$ and $y_2 = a_{21} x_1$. |
| 4 | $y_1$ output; ($y_2, a_{22}, x_2$ in second; $y_3, a_{31}, x_1$ in fourth) | $y_1$ is output. $y_2 = a_{21} x_1 + a_{22} x_2$. $y_3 = a_{31} x_1$. |
| 5 | ($y_2, a_{23}, x_3$ in first; $y_3, a_{32}, x_2$ in third) | $y_2 = a_{21} x_1 + a_{22} x_2 + a_{23} x_3$. $y_3 = a_{31} x_1 + a_{32} x_2$. |
| 6 | $y_2$ output; ($y_3, a_{33}, x_3$ in second; $y_4, a_{42}, x_2$ in fourth) | $y_2$ is output. $y_3 = a_{31} x_1 + a_{32} x_2 + a_{33} x_3$. $y_4 = a_{42} x_2$. |

Fig. 10
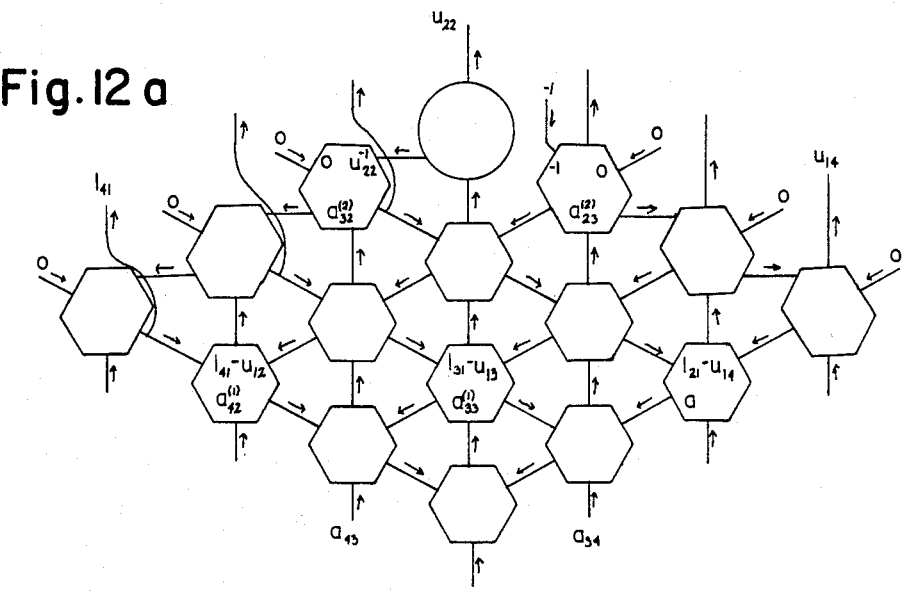
Fig. 12 a
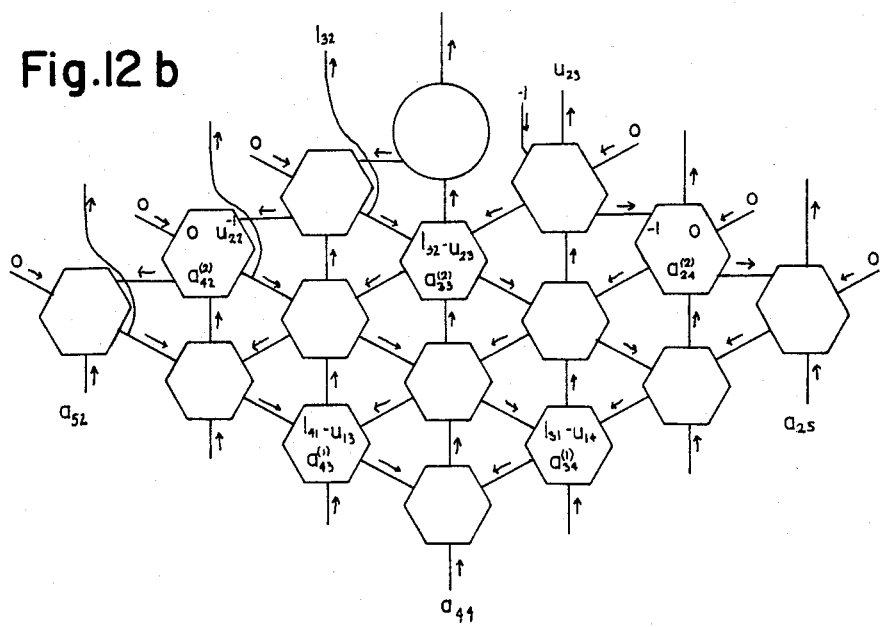
Fig. 12 b

Fig.15

| STEP NUMBER | CONFIGURATION | COMMENTS |
|---|---|---|
| 0 | ○ ← □ ← □ ← $y_1$ ← | $y_1$ enters processor 4. |
| 1 | ○ ← □ ← $y_1$ ← □ ← | $y_1$ moves left one position. |
| 2 | ○ ← $y_1$ □ ← □ ← $y_2$ ← | $y_2$ enters processor 4. |
| 3 | ($a_{11}$, $y_1$ / $x_1$, $b_1$) ← □ ← $y_2$ ← □ ← | $x_1 = (b_1 - y_1)/a_{11}$. ($x_1 = b_1/a_{11}$, since $y_1 = 0$.) |
| 4 | ○ ← $y_2$/$a_{21}$/$x_1$ ← □ ← $y_3$ ← | $y_2 = a_{21} x_1$. |
| 5 | ($a_{22}$, $y_2$ / $x_2$, $b_2$) ← □ ← $y_3$/$a_{31}$/$x_1$ ← □ ← | $x_2 = (b_2 - y_2)/a_{22}$. $y_3 = a_{31} x_1$. |
| 6 | ○ ← $y_3$/$a_{32}$/$x_2$ ← □ ← $y_4$/$a_{41}$/$x_1$ ← | $y_3 = a_{31} x_1 + a_{32} x_2$. $y_4 = a_{41} x_1$. |
| 7 | ($a_{33}$, $y_3$ / $x_3$, $b_3$) ← □ ← $y_4$/$a_{42}$/$x_2$ ← □ →$x_1$ | $x_1$ is output. $x_3 = (b_3 - y_3)/a_{33}$. $y_4 = a_{41} x_1 + a_{42} x_2$. |
| 8 | ○ ← $y_4$/$a_{43}$/$x_3$ ← □ ← $y_5$/$a_{52}$/$x_2$ ← | $y_4 = a_{41} x_1 + a_{42} x_2 + a_{43} x_3$. $y_5 = a_{52} x_2$. |
| 9 | ($a_{44}$, $y_4$ / $x_4$, $b_4$) ← □ ← $y_5$/$a_{53}$/$x_3$ ← □ →$x_2$ | $x_2$ is output. $x_4 = (b_4 - y_4)/a_{44}$. $y_5 = a_{52} x_2 + a_{53} x_3$. |

SYSTOLIC ARRAY APPARATUSES FOR MATRIX COMPUTATIONS

This is a continuation of application Ser. No. 352,701, filed Feb. 26, 1982, now abandoned which was in turn a continuation of application Ser. No. 968,451, filed Dec. 11, 1978, now abandoned.

This invention relates to systolic array apparatus for matrix calculations and particularly to a systolic array system of inner product step processors in the form of a mesh connected network which rhythmically computes and passes data through the system.

The present invention is particularly useful in making the following computations:

(i)

Matrix-vector multiplication
Matrix-matrix multiplication
LU-decomposition of a matrix,
Solving a triangular linear system.

(ii)

Convolution,
Discrete Fourier transform
Finite impulse filter.

The computations in (i) above represent some of the most fundamental and frequently performed computations. The computations of (ii) are typical in signal or image processing. They are frequently performed in electrical engineering calculations.

The apparatuses of this invention can be used in many different ways. They can be attached as special purpose, peripheral devices to general purpose host computers. They can process real-time data streams or they can be components in larger special purpose systems.

The computations performed by the systolic array apparatuses of this invention are usually programmed on general purpose computers. The present invention provides hardware to perform these computations directly and its implementation is cost effective in most modern electronic technologies.

The systolic array systems of this invention exhibit a large degree of parallelism in that many hardware components simultaneously compute. They are multipurpose since one device can be used for more than one computation. One systolic array can be used to compute the LU-decomposition of a matrix and matrix multiplication. The systolic array that computes matrix-vector multiplication can be used for a variety of other computations. The systolic arrays of this invention are made substantially of identical processor elements, which is an advantage in any mass production technology.

The interconnection structure and placement of processors in the systolic arrays of this invention are important for several reasons. All interconnections are between adjacent processors so that data paths are simple and regular. The regularity makes it possible to build a larger device from several smaller devices, thus the design is modular and extensible.

The systolic arrays of this invention require little control logic for the processors. Two methods of control are possible: (1) clocking the operation of the processors, and (2) handshaking on each data path. Initialization and loading logic are unnecessary. Pipelining is used to overlap the overall computation and data transfer times. This makes the systolic arrays of this invention ideal as data channel or DMA (direct memory access) devices on conventional computers. Alternatively, input can also be retrieved from real-time data streams or several different devices can be connected in sequence to perform a more elaborate computation.

We provide a new type of computation system based upon a plurality of interconnected inner product step processors in a mesh connected systolic array whose size is dependent only upon the band width of the band matrix to be processed and independent of band length. Thus, a fixed size systolic array according to this invention can pipeline band matrices with arbitrarily long bands. Processors lying on the boundary of the systolic array may have external connections to the host memory. Thus, an input/output data path of a boundary processor may be sometimes designated as an external input/output connection for the device. A boundary processor may receive input from the host memory through such an external connection, or it may receive a fixed value such as zero. On the other hand, a boundary processor can send data to the host memory through an external output connection. An output of a boundary processor may be selectively ignored and is designated by omitting the corresponding output line.

In the systems of this invention we provide a plurality of interconnected inner product step processors, each having three registers, each register having two connections, one for input and one for output, said processors being connected in a mesh connected systolic array, time signal means acting on each processor to shift the data on its input lines to the corresponding register, make its computation and then make the input values together with the new computed value available as outputs on the output lines, latch means and clock means on each output line whereby when one processor is connected to another the changing output of one during a unit time interval will not interfere with the input to another during said time interval. Processors on the boundary of the systolic array may have external connections to a host memory. Preferably, the processors are synchronous; however, it is possible to arrange them in asynchronous modes, each processor computing its output value when all its inputs are available, as in a data flow model.

In the foregoing general description of our invention we have set out certain objects, purposes and advantages of this invention. Other objects, purposes and advantages of the invention will be apparent from a consideration of the following description and the accompanying drawings in which:

FIG. 6 is a schematic illustration of the first seven pulsations of the linear systolic array of FIG. 5;

Figures 7, 9A:
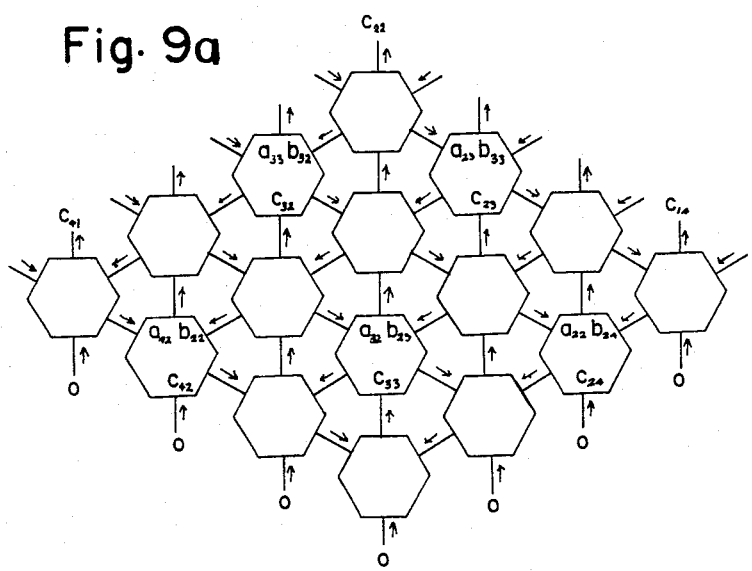
FIG. 7 is an illustration of a typical band matrix multiplication problem.
Figure 8:
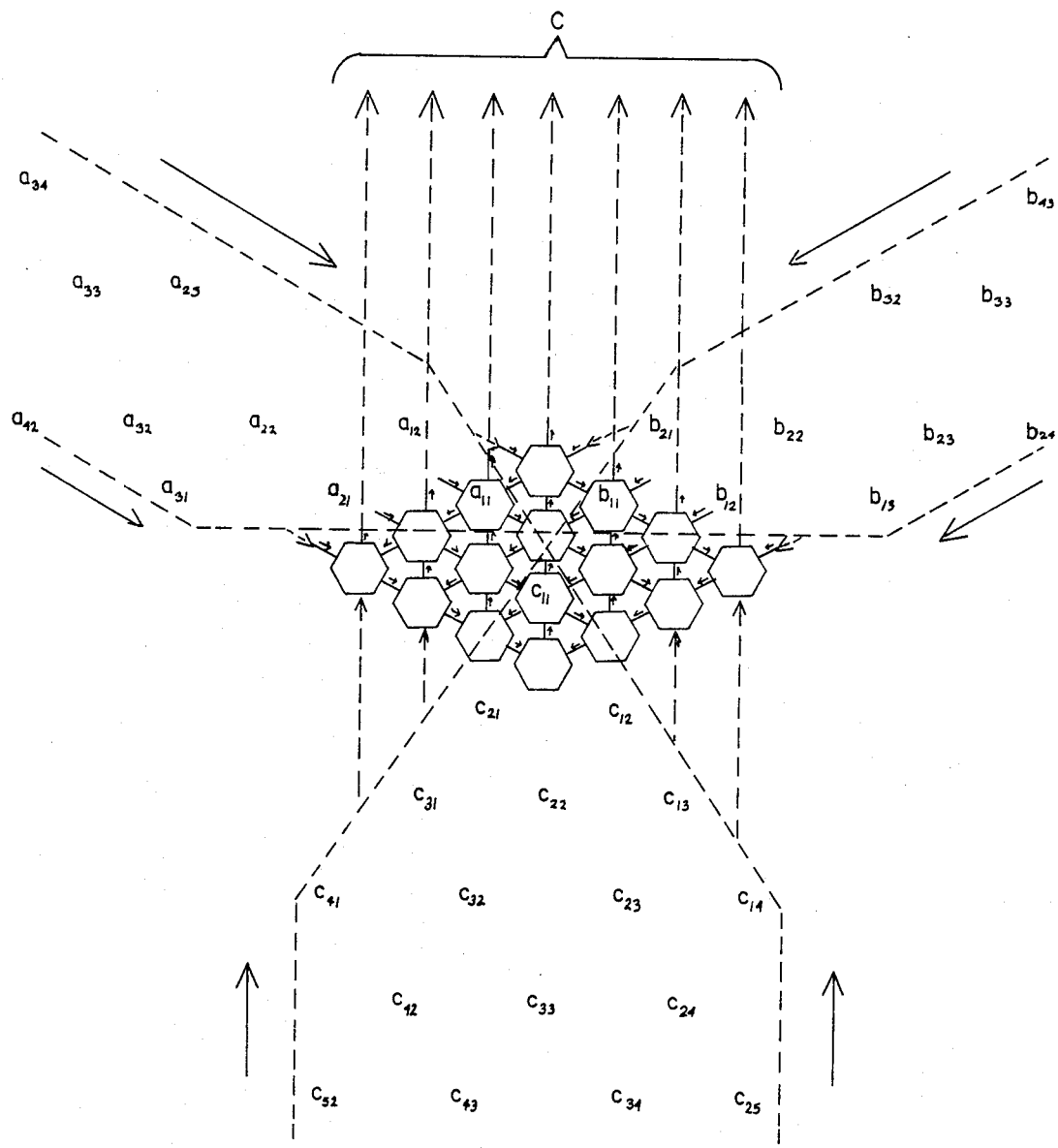
FIG. 8 is a schematic illustration of a hex-connected systolic array according to this invention for the matrix multiplication problem of FIG. 7.
Figure 9B:
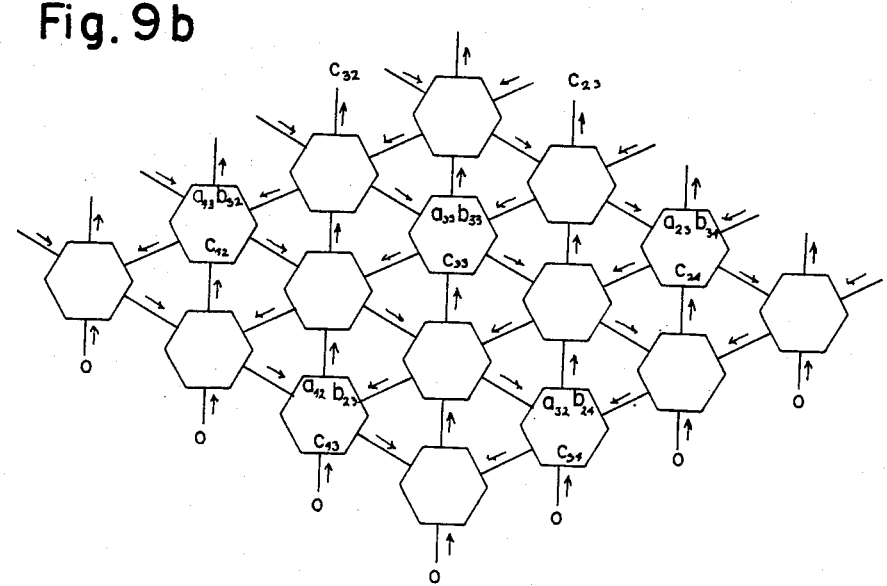
Figure 9C:
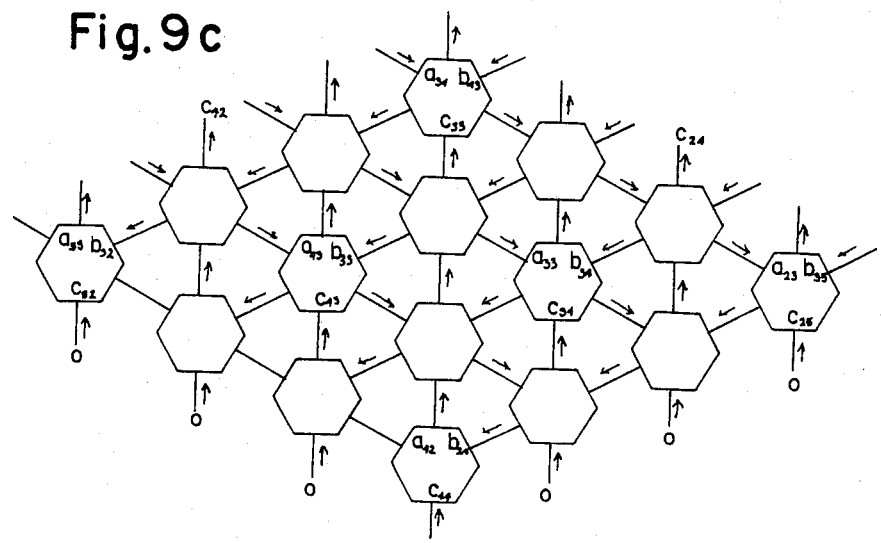
Figure 9D:
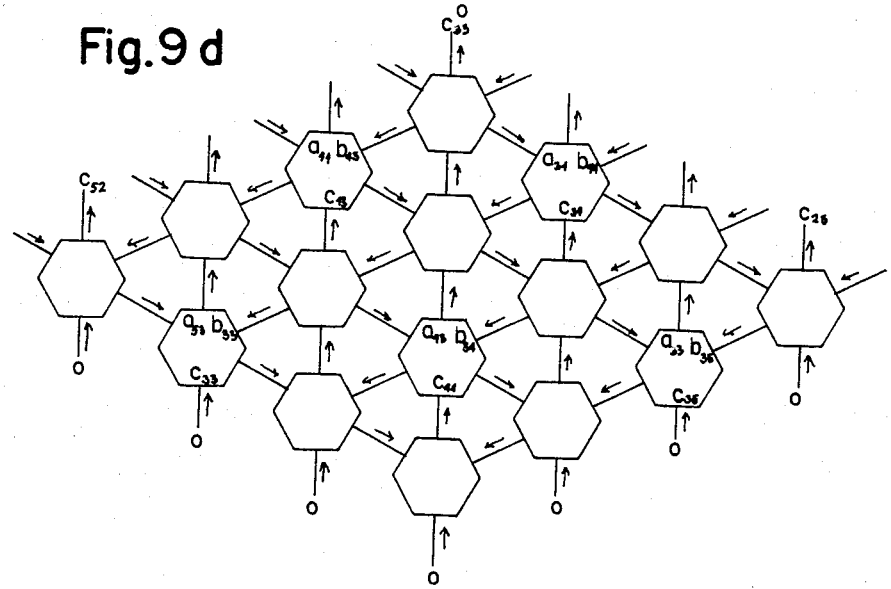
Figure 11:
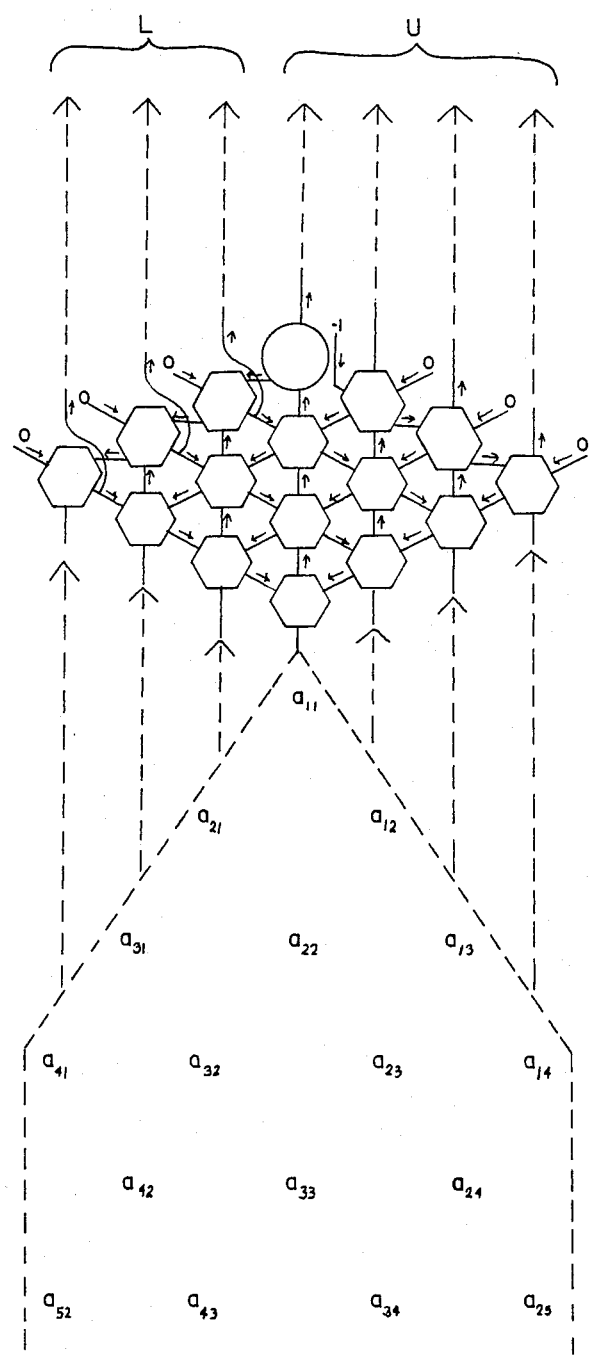
Figure 12:
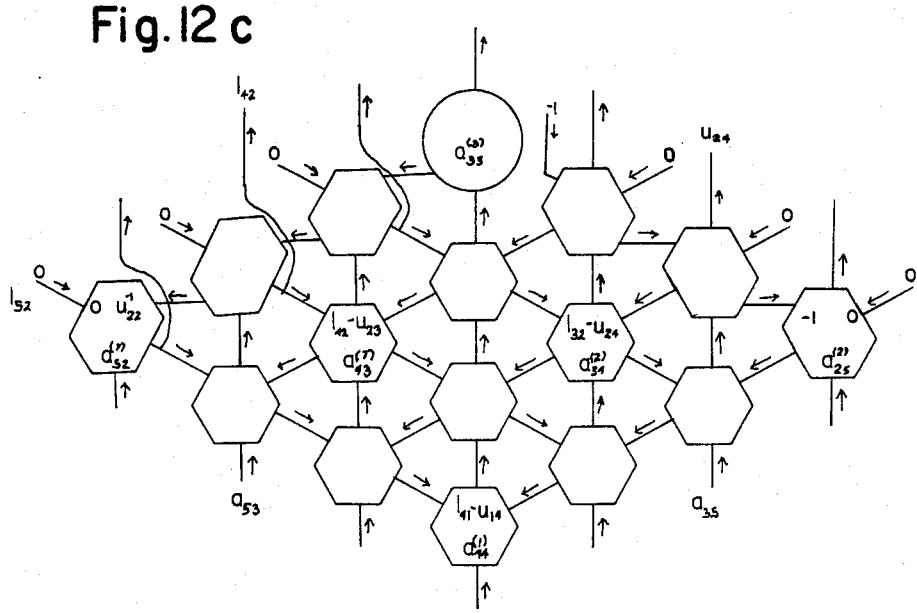
Figure 12:
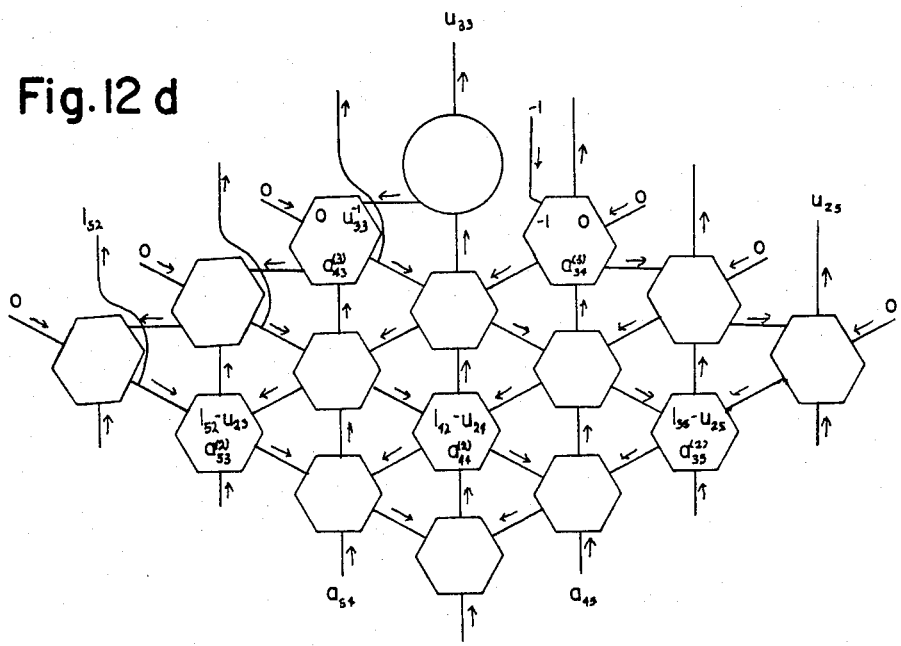
Figure 13:
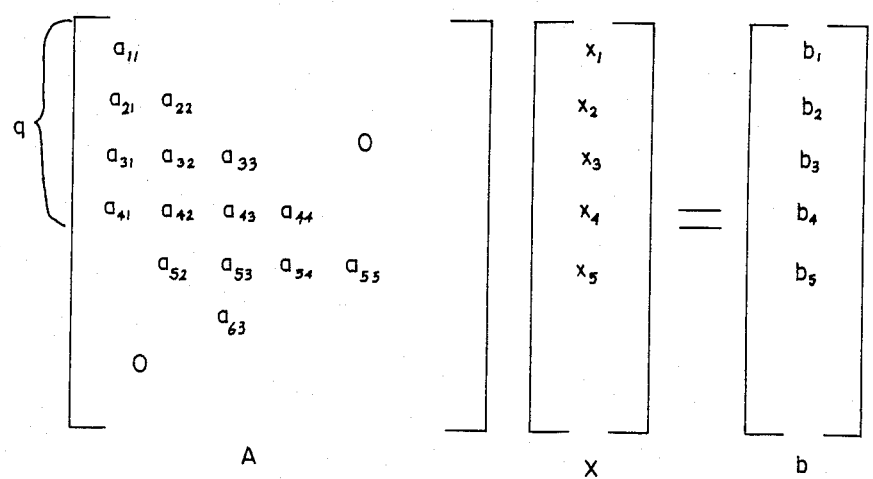
Figure 14:
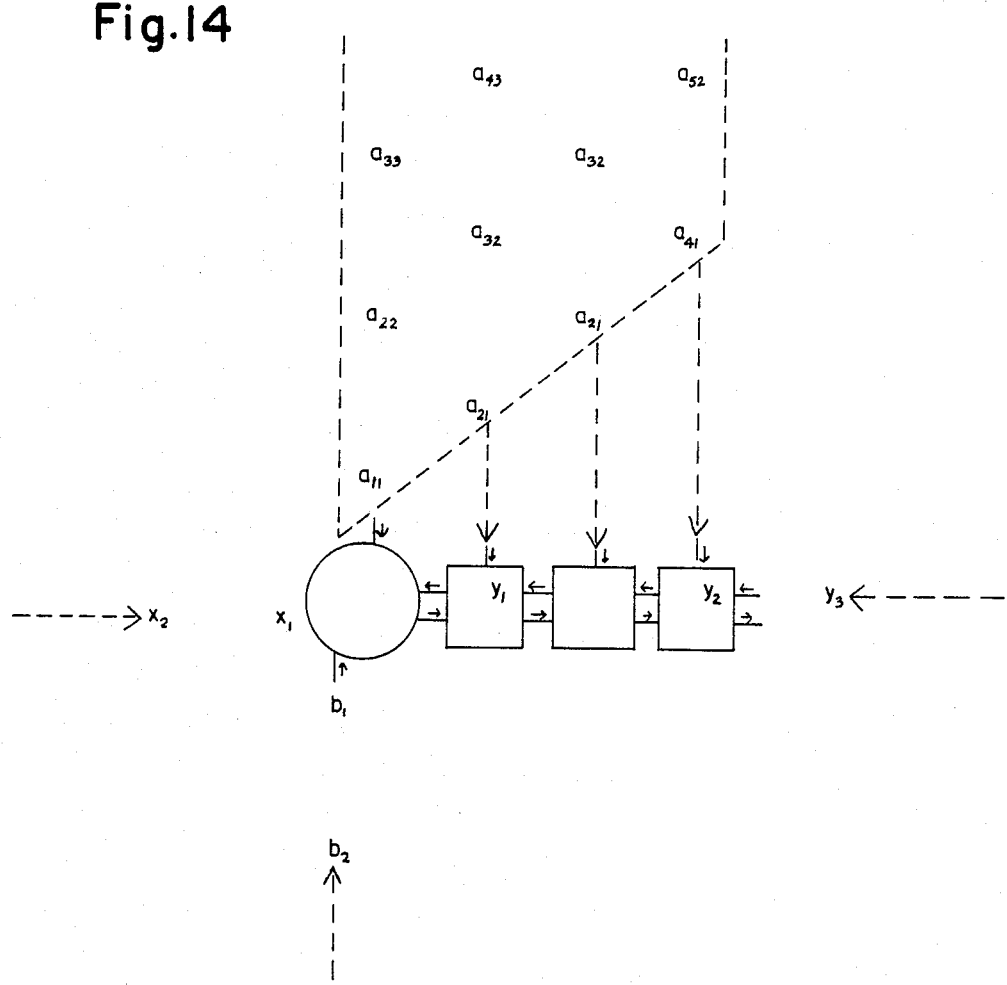

FIGS. 9a, b, c and d are a schematic illustration of four successive pulsations of the hex-connected systolic array of FIG. 8;

FIG. 10 is an illustration of a problem of LU-decomposition of a band matrix;

FIG. 11 is a schematic illustration of a hex-connected systolic array according to this invention for pipelining the LU-decomposition of the band matrix problem of FIG. 10;

FIGS. 12a, b, c and d are a schematic illustration of four successive typical pulsations of the hex-connected systolic array of FIG. 11;

FIG. 13 is an illustration of a typical problem for solution of a triangular linear system;

FIG. 14 is a schematic illustration of a linearly connected systolic array according to this invention for solving the linear triangular system of FIG. 13;

FIG. 15 is a schematic illustration of nine steps including seven pulsations in the linear systolic array of FIG. 14.

Figure 1:
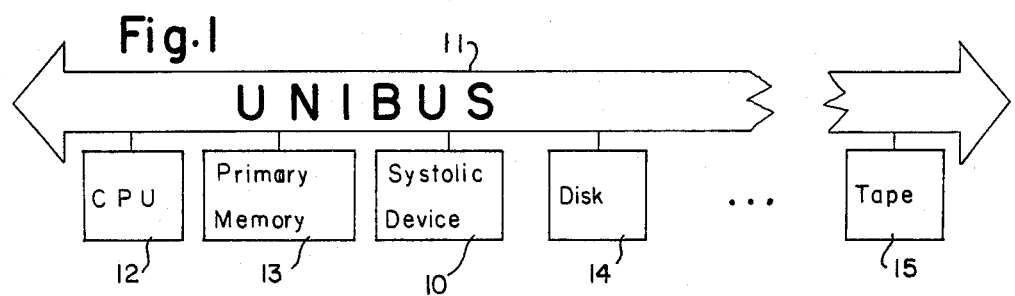
FIG. 1 is a schematic illustration of a systolic device according to this invention connected to the Unibus of a conventional PDP-11 system.

Referring to the drawings we have illustrated in FIG. 1 how a systolic array 10 according to our invention may be incorporated as a part of a conventional PDP-11 system incorporating a UNIBUS 11, and other conventional system parts such as a CPU 12, a primary memory 13, a disk 14, a tape 15, etc.

Figure 2A:
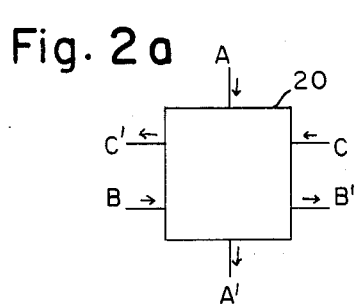
FIGS. 2a and 2b are schematic illustrations of the postulated geometries for the inner product step processor.
Figure 2B:
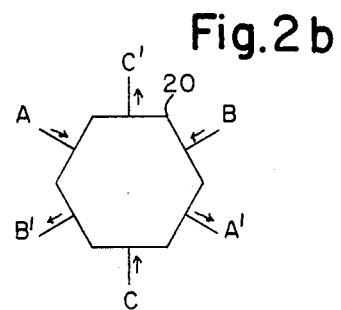
Figure 3A:
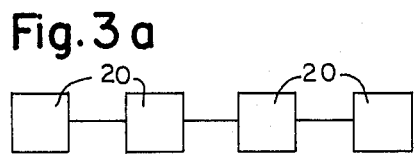
FIGS. 3a, 3b and 3c are schematic illustrations of mesh connected systolic arrays of inner product step processors according to this invention.
Figure 3B:
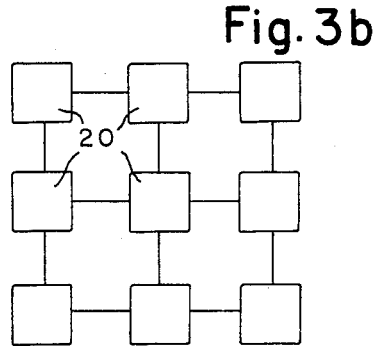
Figure 3C:
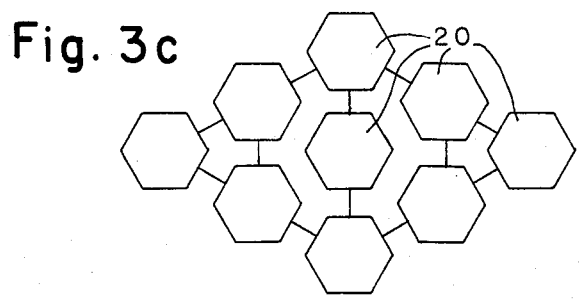

The single common element in all systolic arrays according to our invention is a single inner product step processor 20 having three registors A, B and C as illustrated in FIGS. 2a and 2b and designed to perform a single operation. $C \leftarrow C + A \times B$. As there illustrated the inner product step processor may have two geometries depending upon its use. Each register A, B and C has two connections, one for input and one for output, designated respectively A and A', B and B' and C and C' in FIGS. 2a-b. The geometry of the processor illustrated at 2a is used, for example, for matrix-vector multiplication, FIGS. 4-6 and the solution of triangular linear systems, FIGS. 14-15. The geometry of the processor illustrated at 2b is used, for example, for matrix multiplication, FIGS. 7-9, and LU decomposition determinations, FIGS. 10-12. In our invention we define a basic time unit in terms of the operation of the processor. In each time interval, the processor shifts the data on its input lines denoted by A, B and C in FIG. 2 into $R_A$, $R_B$ and $R_C$, respectively, computes $R_C \leftarrow R_C + R_A \times R_B$ and makes the input values of $R_A$ and $R_B$ together with the new value of $R_C$ available as outputs on the lines A', B', C' of FIGS. 2a-b. All outputs are latched and the logic is clocked so that when one processor is connected to another, the changing output of one during a unit time interval will not interfere with another during this time interval.

A systolic device according to our invention is typically composed of many inner product step processors 20 arranged in a mesh connected scheme in which all connections from one processor are to neighboring processors in one of a linearly connected 3a, an orthogonally connected 3b or a hexagonally connected 3c systolic array.

Each inner product step processor 20 may form a part of a larger integrated array arranged on a single integrated (VLSI) circuit chip.

Processors lying on the boundary of the systolic array may have external connections to a host memory.

Thus, an input/output data path of a boundary processor may sometimes be designated as an external input/output connection for the device. A boundary processor may receive input from the host memory through such external connection, or it may receive a fixed value such as zero. On the other hand, a boundary processor can send data to the host memory through an external output connection. An output of a boundary processor may sometimes by ignored by omitting the corresponding output line.

Figure 4:
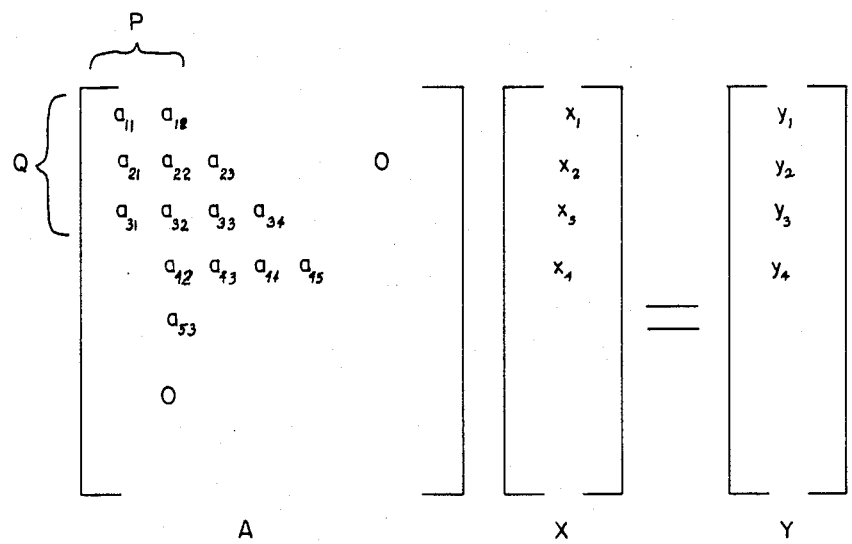
FIG. 4 is a schematic illustration of a matrix-vector multiplication problem to be solved on a linear systolic array according to this invention.

A typical problem for which the systolic array system of this invention may be applied is that illustrated in FIG. 4. The problem there set out is that of multiplying a matrix $A = (a_{ij})$ with a vector $x = (x_1 \ldots x_n)^T$. The elements in the product $y = (y_1 \ldots y_n)^T$ can be computed by the following recurrences.

$$y_i^{(1)} = 0,$$

$$y_i^{(k+1)} = y_i^{(k)} + a_{ik} x_k, \quad k = 1, 2, \ldots, n$$

$$y_i = y_i^{(n+1)}$$

Suppose A is an n×n band matrix with band width $w = p + q - 1$. Assuming $p = 2$ and $q = 3$ the problem will be as set out in FIG. 4. Then the above recurrences can be evaluated by pipelining the $x_i$ and $y_i$ through a systolic array consisting of w linearly connected inner product step processors. We illustrate the operation of the systolic array for the band matrix-vector multiplication problem in FIG. 4. For this case the linearly connected systolic array has four inner product step processors. See FIG. 5.

The general scheme of the computation can be viewed as follows. The $y_i$, which are initially zero, are pumped to the left while the $x_i$ are pumped to the right and the $a_{ij}$ are marching down. All the moves are synchronized. It turns out that each $y_i$ is able to accumulate all its terms, namely, $a_{i,i-2} x_{i-2}, a_{i,i-1} x_{i-1}, a_{i,i} x_i$ and $a_{i,i+1} x_{i+1}$, before it leaves the network. FIG. 6 illustrates the first seven pulsations of the systolic array. Note that when $y_1$ and $y_2$ are output they have the correct values. Observe also that at any given time alternate processors are idle. Indeed, by coalescing pairs of adjacent processors, it is possible to use w/2 processors in the network for a general band matrix with band width w.

Specifying the operation of the systolic array more precisely, we assume that the processors are numbered by integers, 1, 2, . . . , w from the left end processor to the right end processor. Each processor has three registers, $R_A$, $R_x$ and $R_y$, which will hold entries in A, x and y, respectively. Initially, all registers contain zeros. Each pulsation of the systolic array consists of the following operations, but for odd numbered pulses only odd numbered processors are activated and for even numbered pulses only even numbered processors are activated.

1. Shift

—$R_A$ gets a new element in the band of matrix A.

—$R_x$ gets the contents of register $R_x$ from the left neighboring node. (The $R_x$ in processor 1 gets a new component of x.)

—$R_y$ gets the contents of register $R_y$ from the right neighboring node. (Processor 1 outputs its $R_y$ contents and the $R_y$ in processor w gets zero).

2. Multiply and Add.

$$R_y \leftarrow R_y + R_A \cdot R_x$$

Using the square type inner product step processor illustrated in FIG. 2a, we note that the three shift operations in step 1 can be done simultaneously, and that each pulsation of the systolic array takes a unit of time. Suppose the band width of A is $w=p+q-1$. It is readily seen that after w units of time the components of the product $y=Ax$ are pumped out from the left end processor at the rate of one output every two units of time. Therefore, using our systolic network all the n components of y can be computed in $2n+w$ time units, as compared to the $0(wn)$ time needed for a sequential algorithm on a standard Von Neumann computer.

A second problem which is ideally solved by our invention is that of multiplying two n x n matrices. It is readily seen that the matrix product $C=(c_{ij})$ of $A=(a_{ij})$ and $B=(b_{ij})$ can be computed by the following recurrences.

$$c_{ij}^{(1)}=0,$$

$$c_{ij}^{(k+1)}=c_{ij}^{(k)}+a_{ik}b_{kj}, k=1, 2, \ldots, n,$$

$$c_{ij}=c_{ij}^{(n+1)}$$

Let A and B be nxn band matrices of band width $w_1$ and $w_2$, respectively. We will show how the recurrences above can be evaluated by pipelining the $a_{ij}$, $b_{ij}$ and $c_{ij}$ through a systolic array having $w_1w_2$ hex-connected inner product step processors. We illustrate the general scheme by considering the matrix multiplication problem depicted in FIG. 7. The diamond shaped systolic array for this case is shown in FIG. 8, where processors are hex-connected and data flows are indicated by arrows. The elements in the bands of A, B and C are pumped through the systolic network in three directions synchronously. Each $c_{ij}$ is initialized to zero as it enters the network through the bottom boundaries. One can easily see that with the hexagonal inner product processors illustrated at FIGS. 2b, each $c_{ij}$ is able to accumulate all its terms before it leaves the network through the upper boundaries. FIGS. 9a–d show four consecutive pulsations of the systolic array. Let A and B be nxn band matrices of band width $w_1$ and $w_2$, respectively. Then a systolic array of $w_1w_2$ hex-connected processors can pipeline the matrix multiplication $A \times B$ in $3n+\min(w_1,w_2)$ units of time. Note that in any row or column of the network, out of every three consecutive processors, only one is active at given time. It is possible to use about $(w_1w_2)/3$ processors in the network for multiplying two band matrices with band widths $w_1$ and $w_2$.

Another problem ideally solved by the systolic array system of our invention is that of factoring a matrix A into lower and upper triangular matrices L and U. FIG. 10 illustrates the LU-decomposition of a band matrix with $p-4$ and $q=4$. Once the L and U factors are known, it is relatively easy to invert A or solve the linear system $Ax=b$. We deal with the latter problem hereafter. In FIG. 11 we illustrate a systolic array apparatus for computing LU-decomposition.

We assume that matrix A has the property that its LU-decomposition can be done by Gaussian elimination without pivoting. (This is true, for example, when A is a symmetric positive-definite, or an irreducible, diagonally dominant matrix.) The triangular matrices $L=(l_{ij})$ and $U=(u_{ij})$ are evaluated according to the following recurrences.

$$a_{ij}^{(1)} = a_{ij},$$

$$a_{ij}^{(k-1)} = a_{ij}^{(k)} + l_{ik}(-u_{kj}).$$

$$l_{ik} = \begin{cases} 0 & \text{if } i < k, \\ 1 & \text{if } i = k, \\ a_{ik}^{(k)}u_{kk}^{-1} & \text{if } i > k. \end{cases}$$

$$u_{kj} = \begin{cases} 0 & \text{if } k > j, \\ a_{kj}^{(k)} & \text{if } k \leq j. \end{cases}$$

The evaluation of these recurrences can be pipelined on a hex-connected systolic array. A global view of this pipelined computation is shown in FIG. 11 for the LU-decomposition problem depicted in FIG. 10. The systolic array in FIG. 11 is constructed as follows. The processors below the upper boundaries are the standard inner product step processors in FIG. 2b and are hex-connected exactly same as the matrix multiplication network described above. The processor at the top, denoted by a circle, is a special processor. It computes the reciprocal of its input and passes the result southwest, and also passes the same input northward unchanged. The other processors on the upper boundaries are again hexagonal inner product step processors, as illustrated in FIG. 2b, but their orientation is changed: the ones on the upper left boundary are rotated 120 degrees clockwise; the ones on the upper right boundary are rotated 120 degrees counterclockwise.

The flow of data on the systolic array is indicated by arrows in the figure. Similar to matrix multiplication, each processor only operates every third time pulse. FIGS. 12a–d illustrate four consecutive pulsations of the systolic array. Note that in the figure, because A is a band matrix with $p=4$ and $q=4$ we have that $a_{1-3,i}^{(k)}=a_{i+3,i}$ and $a_{i,i+3}^{(k)}=a_{i,i+3}$ for $1 \leq k \leq i$ and $i \geq 2$. Thus, $a_{52}$, for example, can be viewed as $a_{52}^{(2)}$ when it enters the network.

There are several equivalent systolic arrays that reflect only minor changes to the network presented in this section. For example, the elements of L and U can be retrieved as output in a number of different ways. Also, the "$-1$" input to the network can be changed to a "$+1$" if the special processor at the top of the network computes minus the reciprocal of its input.

If A is an nxn band matrix with band width $w=p+q-1$, a systolic array having no more than pq hex-connected processors can compute the LU-decomposition of A in $3n+\min(p,q)$ units of time. If A is an nxn dense matrix, this means that $n^2$ hex-connected processors can compute the L and U matrices, in 4n units of time which includes I/O time.

The fact that the matrix multiplication network forms a part of the LU-decomposition network is due to the similarity of the defining recurrences. In any row or column of the LU-decomposition systolic array, only one out of every three consecutive processors is active at a given time. As we observed for matrix multiplication, the number of processors can be reduced to about pq/3.

Still another problem which the present invention can uniquely handle is that of solving a triangular linear system. Let us assume that we wish to solve a linear system $Ax=b$. After having finished the LU-decomposition of A (e.g., by methods described above), we still have to solve two triangular linear systems $Ly=b$ and Ux=y. This section concerns itself with the solution of triangular linear systems. An upper triangular linear system can always be rewritten as a lower triangular linear system. Without loss of generality, this section deals exclusively with lower triangular linear systems.

Let $A=(a_{ij})$ be a nonsingular nxn band lower triangular matrix. Suppose that A and an n-vector $b=(b_1, \ldots, b_n)^T$ are given. The problem is to compute $x=(x_1 \ldots, x_n)^T$ such that $Ax=b$. The vector x can be computed by the following recurrences.

$$y_i^{(1)}=0,$$

$$y_i^{(k+1)}=y_i^{(k)}+a_{ik}x_k, \; k=1, \ldots, i-1,$$

$$x_i=(b_i-y_i^{(i)})/a_{ii}.$$

Suppose that A is a band matrix with band width $w=q$. (See FIG. 13 for the case when $q=4$.) Then the above recurrences can be evaluated by a systolic array similar to that used for band matrix-vector multiplication. (The similarity of the defining recurrences for these two problems should be noted.) We illustrate our result by considering the linear system problem in FIG. 13. For this case, the systolic array is described in FIG. 14.

The $y_i$, which are initially zero, move leftward through the systolic array while the $x_i$, $a_{ij}$ and $b_i$ are moving as indicated in FIG. 6-2. The left end processor is special in that it performs $x_i \leftarrow (b_i - y_i)/a_{ii}$. (In fact, the special reciprocal processor introduced to solve the LU-decomposition problem is a special case of this more general processor.) Each $y_i$ accumulates inner product terms in the rest of the processors as it moves to the left. At the time $y_i$ reaches the left end processor it has the value $a_{i1}x_1 + a_{i2}x_2 + \ldots + a_{i,i-1}x_{i-1}$, and, consequently, the $x_i$ computed by $x_i \leftarrow (b_i - y_i)/a_{ii}$ at the processor will have the correct value. FIG. 15 demonstrates the first seven pulsations of the systolic array. From the figure one can check that the final values of $x_1, x_2, x_3$ and $x_4$ are all correct. With this network we can solve an nxn band triangular linear system with band width $w=q$ in $2n+q$ units of time. As we observed for the matrix-vector multiplication problem, the number of processors required by the network can be reduced to $w/2$.

Although most of our illustrations are done for band matrices all the systolic arrays work for the regular nxn dense matrix. In this case the band width of the matrix is $w=2n-1$. If the band width of a matrix is so large that it requires more processors than a given network provides, then one should decompose the matrix and solve each subproblem on the network. Thus, for example, the LU-decomposition of an nxn matrix can be computed in $O(n^3/k^2)$ time on a kxk systolic array.

One can often reduce the number of processors required by a systolic array, if the matrix is known to be sparse or symmetric. For example, the matrices arising from a set of finite differences or finite elements approximations to differential equations are usually "sparse band matrices." These are band matrices whose nonzero entries appear only in a few of those lines in the band which are parallel to the diagonal. In this case by introducing proper delays to each processor for shifting its data to its neighbors, the number of processors required by the systolic array illustrated in FIG. 5 can be reduced to the number of those diagonal lines which contain nonzero entries. This variant is useful for performing iterative methods involving sparse band matrices. Another example concerns the LU-decomposition problem considered in FIG. 11. If matrix A is symmetric positive definite, then it is possible to use only the left portion of the hex-connected network, since in this case U is simply $DL^T$ where D is the diagonal matrix $(a_{kk}^{(k)})$.

The optimal choice of the size of the systolic network to solve a particular problem depends upon not only the problem but also the memory band width to the host computer. For achieving high performance, it is desirable to have as many processors as possible in the network, provided they can all be kept busy doing useful computations.

It is possible to use our systolic arrays to solve some nonnumerical problems when appropriate interpretations are given to the addition (+) and multiplication (x) operations. For example, some pattern matching problems can be viewed as matrix problems with comparison and Boolean operations. It is possible to store a dynamically changing data structure in a systolic array so that an order statistic can always be executed in constant time. It can be instructive to view the + and x operations as operations in an abstract algebraic structures such as a semi-ring and then to examine how our results hold in such an abstract setting.

Figure 5:
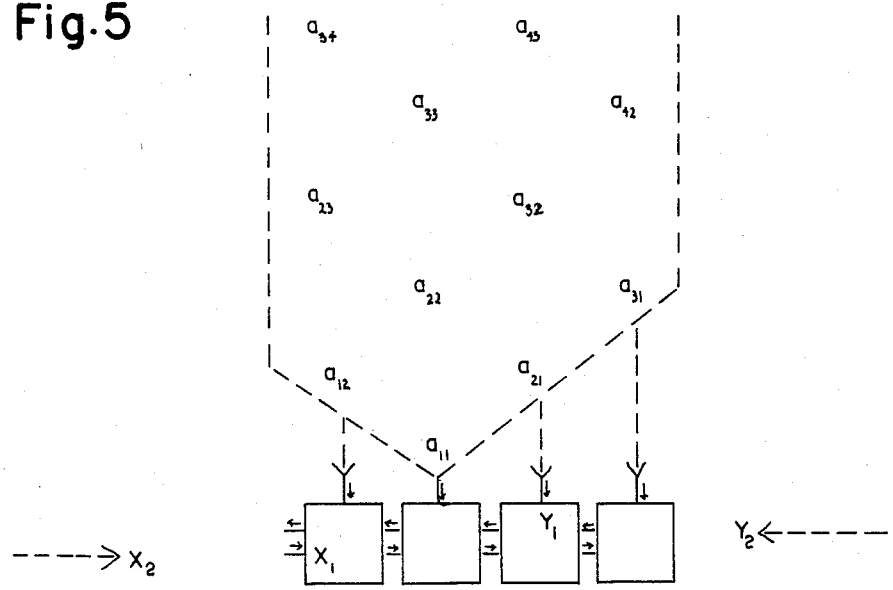
FIG. 5 is a schematic illustration of a linearly connected systolic array according to this invention for the matrix-vector multiplication problem of FIG. 4.

There are a number of important problems which can be formulated as matrix-vector multiplication problems and thus can be solved rapidly by the systolic array in FIG. 5. The problems of computing convolutions, finite impulse response (FIR) filters, and discrete Fourier transforms are such examples. If a matrix has the property that the entries on any line parallel to the diagonal are all the same, then the matrix is a Toeplitz matrix. The convolution problem of vectors a and x is simply the matrix-vector multiplication where the matrix is a triangular Toeplitz matrix as follows:

$$\begin{bmatrix} a_1 & & & & 0 \\ a_2 & a_1 & & & \\ a_3 & a_2 & a_1 & & \\ a_4 & a_3 & a_2 & a_1 & \\ a_5 & a_4 & a_3 & a_2 & a_1 \end{bmatrix} \begin{bmatrix} x_1 \\ x_2 \\ x_3 \\ x_4 \\ x_5 \end{bmatrix} = \begin{bmatrix} b_1 \\ b_2 \\ b_3 \\ b_4 \\ b_5 \end{bmatrix}$$

A p-tap FIR filter can be viewed as a matrix-vector multiplication where the matrix is a band upper triangular Toeplitz matrix with band width $w=p$. The computation of a 4-tap filter with coefficients $a_1, a_2, a_3$ and $a_4$ may be represented as:

$$\begin{bmatrix} a_1 & a_2 & a_3 & a_4 & & \\ & a_1 & a_2 & a_3 & a_4 & \\ & & a_1 & a_2 & a_3 & a_4 \\ & & & a_1 & a_2 & a_3 & a_4 \end{bmatrix} \begin{bmatrix} x_1 \\ x_2 \\ x_3 \\ x_4 \end{bmatrix} = \begin{bmatrix} y_1 \\ y_2 \\ y_3 \\ y_4 \end{bmatrix}$$

$A$ $x$

On the other hand, an n-point discrete Fourier transform is the matrix-vector multiplication, where the (i,j) entry of the matrix is $\omega^{(i-1)(j-1)}$ and $\omega$ is a primitive $n^{th}$ root of unity. The discrete Fourier transformation of vector x may be represented as:

$$\begin{bmatrix} 1 & 1 & 1 & 1 & \\ 1 & \omega & \omega^2 & \omega^3 & \\ 1 & \omega^2 & \omega^4 & \omega^6 & \\ 1 & \omega^3 & \omega^6 & \omega^9 & \\ & & \cdot & & \\ & & \cdot & & \\ & & \cdot & & \end{bmatrix} \begin{bmatrix} x_1 \\ x_2 \\ x_3 \\ x_4 \\ x_5 \\ \cdot \\ \cdot \end{bmatrix} = \begin{bmatrix} b_1 \\ b_2 \\ b_3 \\ b_4 \\ b_5 \\ \cdot \\ \cdot \end{bmatrix}$$

In such convolution and filter problems each processor needs to receive an entry of the matrix only once, and this entry can be shipped to the processor through horizontal connections and stay in the processor during the rest of the computation. For the discrete Fourier transform problem each processor can in fact generate on-the-fly the powers of $\omega$ it requires. As a result, for these three problems it is not necessary for each processor in the network to have the external input connection on the top of the processor, as depicted in FIG. 5.

In the following we describe how the powers of $\omega$ can be generated on-the-fly during the process of computing an n-point discrete Fourier transform. The requirement is that if a processor is i units apart from the middle processor then at time $i+2j$ the processor must have the value of $\omega^{j^2+ij}$ for all i,j. This requirement can be fulfilled by using the algorithm below. We assume that each processor has one additional register $R_t$. All processors except the middle one perform the following operations in each step, but for odd (respectively, even) numbered time steps only processors which are odd (even) units apart from the middle processor are activated. For all processors except the middle one the contents of both $R_A$ and $R_t$ are initially zero.

1. Shift. If the processor is in the left (respectively, right) hand side of the middle processor then
 —$R_A$ gets the contents of register $R_A$ from the right (respectively, left) neighbouring processor.
 —$R_t$ gets the contents of register $R_t$ from the right (respectively, left) neighbouring processor.
2. Multiply.

$$R_A \leftarrow R_A \times R_t.$$

The middle processor is special; it performs the following operations at every even numbered time step. For this processor the contents of both $R_A$ and $R_t$ are initially one.

1. $R_A \leftarrow R_A \times R_t^2 \times \omega$

2. $R_t \leftarrow R_t \times \omega$

Note that all the systolic arrays described above store and retrieve elements of the matrix in the same order. (See FIGS. 5, 8, 11 and 14). Therefore, we recommend that matrices be always arranged in memory according to this particular ordering so that they can be accessed efficiently by any of the systolic arrays.

One of the most important features of our systolic arrays are that their data paths are very simple and regular, and they support pipeline computations. Simple and regular data paths imply lost cost and efficient implementations of the arrays in VLSI (or even printed circuit technology). Pipelining can overlap I/O with computation to ensure high throughput. Since loading of data into the network occurs naturally as computation proceeds, no extra control logic is required. Nor is initialization logic needed. We have discovered that some data flow patterns are fundamental in matrix computations. For example, the two-way flow on the linearly connected network is common to both matrix-vector multiplication and solution of triangular linear systems (FIGS. 5 and 14) and the three-way flow on the hexagonally mesh-connected network is common to both matrix multiplication and LU-decomposition (FIGS. 8 and 11). A practical implication of this fact is that one systolic device may be used for solving many different problems. Moreover, we note that almost all the processors needed in any of these devices are the inner product step processor illustrated in FIGS. 2a-b.

Using the system of this invention with a linearly connected network of size O(n) both the convolution of two n-vectors and the n-point discrete Fourier transform can be computed in O(n) units of time, rather than O (n log n) as required by the sequential FFT algorithm.

In the foregoing specification we have set out certain preferred practices and embodiments of this invention; however, it will be understood that this invention may be otherwise embodied within the scope of the following claims.

We claim:

1. In a computer system having external handling means delivering input to be processed and receiving output and a plurality of processors forming a network receiving said input, the improvement comprising said plurality of processors being independent of a central control which sends control instructions to all processors simultaneously and being made up of boundry processors lying on the boundry of the network and being one of inner product step processors and processors capable of performing usual arithmetic operations including division and internal processors within the area surrounded by said boundry processors and being inner product step processors, said processors being assembled in a network by nearest neighbor connections in which a regular flow of data is maintained, synchronizing means connected to each processor rythmically feeding data into and out of processors in said network and between said network and said external handling means and connections between at least one of the boundry processors and said external handling means whereby data is fed therebetween.

2. In a computer system as claimed in claim 1 wherein the synchronizing means is a clocking signal means.

3. In a computer system as claimed in claim 1 wherein the synchronizing means is an asynchronous handshaking means.

4. In a computer system as claimed in claim 1 wherein the synchronizing means is one of a clocking signal means and an asynchronous handshaking means.

5. In a computer system as claimed in claim 1 or 4 wherein one of said inner product step processors includes a register and in each cycle takes in two input signals denoted by a, b, and produces two output signals denoted by a', b' where a'=a and b'=b and updates the content of the said register internal to the processor denoted by c to c', where $c'=c+ab$.

6. In a computer system as claimed in claim 5 wherein the said network of processors is a rectangular array of orthogonally connected inner product step processors that compute the multiplication of two matrices, and wherein the external handling means delivers entries of one of the said matrices to one side of said rectangular array of processors in a row format wherein each boundry processor on said one side receives sequentially entries solely from one row of said one matrix and delivers entries of the other matrix in a column format at right angles to the entry direction of the said one matrix wherein each boundry processor on an adjacent side of said rectangular array receives sequentially entries solely from one column of said other matrix and entries of the computed matrix are delivered to said external handling means from the boundry processors of any side of said array.

7. In a computer system as claimed in claim 5 wherein the processors are a rectangular array of orthogonally connected inner product step processors that compute the multiplication of two matrices, and wherein the external handling means preloads entries of one of the said matrices to the said array of processors so that each processor has one entry of the said matrix and delivers entries of the other matrix in a column format to one side of the said array wherein each boundry processor on said one side of said array receives sequentially entries solely from one column of said other matrix and entries of the computed matrix are delivered to said external handling means from the boundry processors of a side adjacent to said one side of said array in a column format at right angle to the input direction of the said other matrix.

8. In a computer system as claimed in claim 1 or 4 wherein one of said inner product step processors in each cycle takes in three input signals denoted a, b, c and produces three output signals denoted a', b', c' where a'=a; b'=b and c'=c+a b.

9. In a computer system as claimed in claim 8 wherein the said network of processors is a one dimensional array of linearly connected inner product step processors that compute multiplication of a matrix and a ventor, said array having at each end a processor with only one nearest neighbor, and wherein the external handling means delivers entries of the said matrix to the said array of processors in a diagonal format wherein each processor receives sequentially entries solely from the diagonal of the said matrix or from the same subdiagonals of the said matrix and delivers entries of the said vector sequentially to a processor having only one nearest neighbor and entries of the computed vector are delivered to said external handling means from the other processor having one nearest neighbor.

10. In a computer system as claimed in claim 8 wherein the said network of processors is a one dimensional array of linearly connected inner product step processors that compute the convolution of two vectors, said array having at each end a processor with only one nearest neighbor and wherein the external handling means preloads entries of one of said vectors to said array of processors in a format in which each processor receives one entry of the said vector and delivers entries of the other of said two vectors sequentially to a processor having only one nearest neighbor processor and entries of the computed vector are output to said external handling means from the said or the other processor having one nearest neighbor.

11. In a computer system as claimed in claim 8 wherein the said network of processors is a one dimensional array of linearly connected inner product step processors that compute a finite impulse response filter, said array having at each end a processor with only one nearest neighbor and wherein the external handling means preloads entries of weights associated with the said filter to said array of processors in a format in which each processor receives one weight and delivers inputs for said filter to one processor having one nearest neighbor and computed results of the said filter are output to said external handling means from the said or the other processor having one nearest neighbor.

12. In a computer system as claimed in claim 8 wherein the said network of processors, is a one dimensional array of linearly connected processors and all except one are inner product step processors and said one processor is a boundry processor that in each cycle takes in three inputs denoted a, b, y and produces one output denoted $x'$ where $x' = (b - y)/a$ and the said array computes the solution of a triangular linear system of equations, said array having at each end a processor with only one nearest neighbor and wherein the external handling means delivers entries of the given matrix corresponding to the said triangular system of equations to the said array of processors in a diagonal format wherein said one processor receives sequentially entries solely from the diagonal of said matrix and the remaining processors each receive sequentially entries from the same subdiagonal of the said matrix and delivers entries of the given vector corresponding to the triangular linear system to said one processor and entries of the computed vector are delivered to said external handling means from the other processor having one nearest neighbor.

13. In a computer system as claimed in claim 8 wherein the said network of processors is a diamond shaped array of hexagonally connected inner product step processors that compute the multiplication of two matrices, and wherein the external handling means delivers entries of one of the said matrices to one side of the said diamond shaped array of processors in a diagonal format wherein each boundry processor on the side receives sequentially entries solely from the diagonal of the said one matrix or from the same subdiagonal of said one matrix, and delivers entries of the other matrix to an adjacent side of the said diamond shaped array of processors in a diagonal format at 120° angles to the entry direction of said one matrix wherein each processor receives sequentially entries solely from the diagonal of said other matrix or from the same subdiagonal of said other matrix and entries of the computed matrix are delivered to said external handling means from boundry processors on the two sides of the array of processors receiving the entries of said two matrices wherein the boundry processor having the least number of nearest neighbors intermediate the said two sides delivers sequentially output soley from diagonal of the said computed matrix and the other boundry processors of the said two sides each deliver sequentially output from one subdiagonal of the computed matrix.

14. In a computer system as claimed in claim 8 wherein the said network of processors is a diamond shaped array of hexagonally connected and all except one are inner product step processors, said one processor being a boundry processor on the boundry of the network that in each cycle takes in one input denoted by a and produces two outputs denoted by a and r wherein $a' = a$ and $r' = 1/a$ and which computes LU decomposition of a matrix, and wherein the external handling means delivers entries of the said matrix along two adjacent sides of said diamond shaped array opposite said one boundry processor in a diagonal format wherein the boundry processor directly opposite said one boundry processor between said two adjacent sides receives entries solely from the diagonal of the matrix and the other boundry processor on said two adjacent sides each receive sequentially entries solely from the same subdiagonal of said one matrix and entries of the computed L matrix and computed U matrix are delivered in the diagonal format from the boundry processors on the two sides sharing the said one boundry processor to said external handling means.

* * * * *